United States Patent
Genko et al.

(10) Patent No.: US 10,302,039 B2
(45) Date of Patent: May 28, 2019

(54) ENGINE SYSTEM AND CONTROL METHOD FOR ENGINE SYSTEM

(71) Applicant: TOYOTA JIDOSHA KABUSHIKI KAISHA, Toyota-shi, Aichi-ken (JP)

(72) Inventors: Takeshi Genko, Toyota (JP); Daigo Ando, Toyota (JP); Chisa Watanabe, Toyota (JP); Shinya Kondo, Toyota (JP); Takahiro Nishigaki, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/854,854

(22) Filed: Dec. 27, 2017

(65) Prior Publication Data
US 2018/0195459 A1    Jul. 12, 2018

(30) Foreign Application Priority Data
Jan. 11, 2017  (JP) ................ 2017-002456

(51) Int. Cl.
| | |
|---|---|
| *F02D 41/30* | (2006.01) |
| *F02M 37/18* | (2006.01) |
| *F02D 35/02* | (2006.01) |
| *F02D 41/14* | (2006.01) |

(52) U.S. Cl.
CPC ....... *F02D 41/3082* (2013.01); *F02D 35/023* (2013.01); *F02D 41/3094* (2013.01); *F02M 37/18* (2013.01); *F02D 41/1454* (2013.01); *F02D 2200/0602* (2013.01)

(58) Field of Classification Search
CPC ............. F02D 41/3082; F02D 41/3094; F02D 41/1454; F02D 41/30; F02D 41/402; F02D 41/008; F02D 41/0085; F02D 41/1475; F02D 35/023; F02D 2200/0602; F02M 37/18; F02M 69/046
USPC ....... 123/299, 300, 431, 443, 672, 691, 457; 701/103–105
See application file for complete search history.

(56) References Cited

U.S. PATENT DOCUMENTS

| | | | | |
|---|---|---|---|---|
| 2006/0207241 A1* | 9/2006 | Araki | ................ | F02D 41/0255 60/284 |
| 2007/0246004 A1* | 10/2007 | Matekunas | ............. | F02D 17/02 123/299 |
| 2009/0138181 A1* | 5/2009 | Hokuto | ............... | F02D 41/1475 701/106 |

(Continued)

FOREIGN PATENT DOCUMENTS

JP    2012-233425    11/2012

*Primary Examiner* — Hai H Huynh
(74) *Attorney, Agent, or Firm* — Finnegan, Henderson, Farabow, Garrett & Dunner, LLP (57) ABSTRACT

An engine system includes an engine that, a fuel supply device, and an electronic control unit. The electronic control unit is configured to control the fuel supply device and to perform operation control of the engine by adjusting an injection ratio between fuel injection from an in-cylinder injection valve and a port injection valve according to the operation state of the engine. The electronic control unit is configured to perform imbalance determination. The electronic control unit is configured to change a region of fuel injection from a first fuel injection region to a second fuel injection region when the electronic control unit determines that a lean imbalance is occurred with respect to the fuel injection in which the fuel injection from the port injection valve is performed.

6 Claims, 5 Drawing Sheets

(56) References Cited

U.S. PATENT DOCUMENTS

2012/0277979 A1 11/2012 Kato et al.
2015/0167578 A1* 6/2015 Hotta .................. F02D 41/3035
                                                                   701/104
2016/0348606 A1* 12/2016 Suzuki ................ F02D 41/3094

* cited by examiner

ENGINE SYSTEM AND CONTROL METHOD FOR ENGINE SYSTEM

INCORPORATION BY REFERENCE

The disclosure of Japanese Patent Application No. 2017-002456 filed on Jan. 11, 2017 including the specification, drawings and abstract is incorporated herein by reference in its entirety.

BACKGROUND

1. Technical Field

The disclosure relates to an engine system and a control method for an engine system. Specifically, the disclosure relates to an engine system provided with a multi-cylinder engine that includes an in-cylinder injection valve injecting fuel into a cylinder and a port injection valve injecting fuel into an intake port and a control method for an engine system.

2. Description of Related Art

In the related art, as an engine system provided with a multi-cylinder engine that includes an in-cylinder injection valve and a port injection valve, there is proposed an engine system in which a process of offsetting an imbalance is performed when there is an unevenness abnormality (imbalance) between cylinders caused by fuel injection (refer to Japanese Unexamined Patent Application Publication No. 2012-233425 (JP 2012-233425 A)). In the engine system, as the process of offsetting the imbalance, a process of increasing or decreasing a fuel injection time, a process of increasing or decreasing the effective opening area (in the case of a variable injection hole type injection valve), a process of increasing or decreasing the intake valve opening degree or the like is performed such that the imbalance is offset, in order to appropriately correct the imbalance.

SUMMARY

However, in the engine system, in a case where an imbalance is appropriately corrected by increasing the fuel injection time when there is a lean imbalance where the fuel injection amount with respect to any of a plurality of cylinders is smaller than the fuel injection amount with respect other cylinders, a catalyst of an exhaust gas control apparatus attached to an exhaust system may be overheated if the degree of imbalance is relatively large. In order to further restrain the catalyst from being overheated, it is needed to individually increase the fuel injection amount with respect to the cylinders but the increase in fuel injection amount becomes excessive.

The disclosure provides an engine system and a control method for an engine system with which it is possible to further restrain a catalyst of an exhaust gas control apparatus attached to an exhaust system from being overheated when there is a lean imbalance in port injection and to further suppress an imbalance.

A first aspect of the disclosure provides an engine system. The engine system includes an engine that has a plurality of cylinders, a fuel supply device, and an electronic control unit. The engine includes an in-cylinder injection valve and a port injection valve. The in-cylinder injection valve is configured to inject fuel into each cylinder of the engine. The port injection valve is configured to inject fuel into an intake port of the engine. The fuel supply device includes a first pump and a second pump. The first pump is configured to apply a pressure to fuel from a fuel tank such that the fuel is supplied to a first supply flow path to which the port injection valve is connected. The second pump is configured to apply a pressure to the fuel in the first supply flow path such that the fuel is supplied to a second supply flow path to which the in-cylinder injection valve is connected. The electronic control unit is configured to control the fuel supply device and to perform operation control of the engine by perform operation control of the engine by adjusting an injection ratio between fuel injection from the in-cylinder injection valve and fuel injection from the port injection valve according to an operation state of the engine. The electronic control unit is configured to perform imbalance determination based on any of a variation in air-fuel ratio and a rotational variation of the engine with respect to the fuel injection from the in-cylinder injection valve and the fuel injection from the port injection valve. The imbalance determination includes determination on whether a rich imbalance is occurred and determination on whether a lean imbalance is occurred. The rich imbalance is an imbalance in which a fuel injection amount with respect to any of the cylinders is larger than a fuel injection amount with respect to the other of the cylinders. The lean imbalance is an imbalance in which a fuel injection amount with respect to any of the cylinders is smaller than a fuel injection amount with respect to the other of the cylinders. The electronic control unit is configured to change a region of fuel injection from a first fuel injection region to a second fuel injection region when the electronic control unit determines that the lean imbalance is occurred with respect to the fuel injection from the port injection valve. The first fuel injection region is a region in which the fuel injection from the port injection valve is performed. The second fuel injection region is a region in which the fuel injection from the in-cylinder injection valve is performed.

With the engine system according to the first aspect of the disclosure, operation control of the engine is performed while the injection ratio between the fuel injection in which the in-cylinder injection valve is used and the fuel injection in which the port injection valve is used is adjusted based on the operation state of the engine. In addition, the imbalance determination of determining whether there is the rich imbalance where the fuel injection amount with respect to any of the cylinders is larger than the fuel injection amount with respect to the other of the cylinders and determining whether there is the lean imbalance where the fuel injection amount with respect to any of the cylinders is smaller than the fuel injection amount with respect to the other of the cylinders is performed based on any of the variation in air-fuel ratio and the rotational variation of the engine with respect to the fuel injection in which the in-cylinder injection valve is used and the fuel injection in which the port injection valve is used. When the electronic control unit determines that there is the lean imbalance with respect to the fuel injection in which the port injection valve is used in the imbalance determination, the first fuel injection region in which the port injection valve is used is changed to the second fuel injection region in which the in-cylinder injection valve is used. Accordingly, it is possible to further suppress an imbalance that occurs when fuel is injected from the port injection valve in the first fuel injection region in which the port injection valve is used, and to further restrain a catalyst of the exhaust gas control apparatus from being overheated. That is, it is possible to further suppress the imbalance while further restraining the catalyst of the exhaust gas control apparatus from being overheated.

In the engine system, the electronic control unit may be configured to perform the fuel injection from the in-cylinder injection valve at a fuel injection timing at which the engine is unlikely to misfire when the electronic control unit changes the region of fuel injection from the first fuel injection region to the second fuel injection region and operates the engine. The first fuel injection region in which the port injection valve is used is a region in which operating the engine with fuel being injected from the port injection valve is advantageous in terms of fuel efficiency and stability in comparison with operating the engine with fuel being injected from the in-cylinder injection valve. Therefore, according to the first aspect of the disclosure, since the fuel is injected from the in-cylinder injection valve at the fuel injection timing at which the engine is unlikely to misfire when the engine is operated after the first fuel injection region in which the port injection valve is used is changed to the second fuel injection region in which the in-cylinder injection valve is used, a decrease in fuel efficiency and stability caused by switching to the second fuel injection region in which the in-cylinder injection valve is used can be further suppressed. Here, the meaning of the expression "fuel injection timing at which misfire is unlikely to occur" may include a fuel injection timing with the lowest possibility of misfire obtained by an experiment or the like, a fuel injection timing close to such a fuel injection timing, and a fuel injection timing at which stable explosive combustion can be achieved.

In the engine system, the electronic control unit may be configured to control the fuel supply device such that the fuel pressure in the second supply flow path becomes a pressure at which the engine is unlikely to misfire when the electronic control unit changes the region of fuel injection from the first fuel injection region to the second fuel injection region and operates the engine. According to the first aspect of the disclosure, a decrease in fuel efficiency and stability caused by switching to the second fuel injection region in which the in-cylinder injection valve is used can be further suppressed. Here, the meaning of the "pressure at which misfire is unlikely to occur" may include a fuel pressure in the second supply flow path with the lowest possibility of misfire obtained by an experiment or the like, a fuel pressure close to such a fuel pressure, or a fuel pressure at which stable explosive combustion can be achieved.

In the engine system, the electronic control unit may be configured to change the region of fuel injection back to the first fuel injection region from the second fuel injection region when the electronic control unit determines that the lean imbalance is occurred with respect to the fuel injection in which the in-cylinder injection valve is used after the first fuel injection region. In many general engines, when the lean imbalance occurs with respect to both of the fuel injection in which the port injection valve is used and the fuel injection in which the in-cylinder injection valve is used, the degree of the lean imbalance with respect to the fuel injection in which the port injection valve is used is smaller than the degree of the lean imbalance with respect to the fuel injection in which the in-cylinder injection valve is used. Therefore, according to the first aspect of the disclosure, since the region of fuel injection changed to the second fuel injection region in which the in-cylinder injection valve is used is changed back to the first fuel injection region in which the port injection valve is used when the electronic control unit determines that there is the lean imbalance with respect to the fuel injection in which the in-cylinder injection valve is used after the first fuel injection region in which the port injection valve is used is changed to the second fuel injection region in which the in-cylinder injection valve is used, it is possible to reduce the degree of the imbalance.

In the engine system, the electronic control unit may be configured to perform the fuel injection from the port injection valve at a fuel injection timing at which the engine is unlikely to misfire when the electronic control unit changes the region of fuel injection back to the first fuel injection region from the second fuel injection region and operates the engine. According to the first aspect of the disclosure, it is possible to further suppress the degree of the imbalance. Here, the meaning of the expression "fuel injection timing at which misfire is unlikely to occur" may include a fuel injection timing with the lowest possibility of misfire obtained by an experiment or the like, a fuel injection timing close to such a fuel injection timing, and a fuel injection timing at which stable explosive combustion can be achieved.

A second aspect of the disclosure provides a control method for an engine system. The engine system includes an engine that has a plurality of cylinders, a fuel supply device, and an electronic control unit. The engine includes an in-cylinder injection valve and a port injection valve. The in-cylinder injection valve is configured to inject fuel into each cylinder of the engine. The port injection valve is configured to inject fuel into an intake port of the engine. The fuel supply device includes a first pump and a second pump. The first pump is configured to apply a pressure to fuel from a fuel tank such that the fuel is supplied to a first supply flow path to which the port injection valve is connected. The second pump is configured to apply a pressure to the fuel in the first supply flow path such that the fuel is supplied to a second supply flow path to which the in-cylinder injection valve is connected. The control method includes: controlling, by the electronic control unit, the fuel supply device and performing, by the electronic control unit, operation control of the engine by adjusting an injection ratio between fuel injection from the in-cylinder injection valve and fuel injection from the port injection valve according to an operation state of the engine; performing, by the electronic control unit, imbalance determination based on any of a variation in air-fuel ratio and a rotational variation of the engine with respect to the fuel injection from the in-cylinder injection valve and the fuel injection from the port injection valve; and changing, by the electronic control unit, a region of fuel injection from a first fuel injection region to a second fuel injection region when the electronic control unit determines that the lean imbalance is occurred with respect to the fuel injection from the port injection valve. The imbalance determination includes determination on whether a rich imbalance is occurred and determination on whether a lean imbalance is occurred. The rich imbalance is an imbalance in which a fuel injection amount with respect to any of the cylinders is larger than a fuel injection amount with respect to the other of the cylinders. The lean imbalance is an imbalance in which a fuel injection amount with respect to any of the cylinders is smaller than a fuel injection amount with respect to the other of the cylinders. The first fuel injection region is a region in which the fuel injection from the port injection valve is performed. The second fuel injection region is a region in which the fuel injection from the in-cylinder injection valve is performed.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, an embodiment of the disclosure will be described by using an example.

Figure 1:
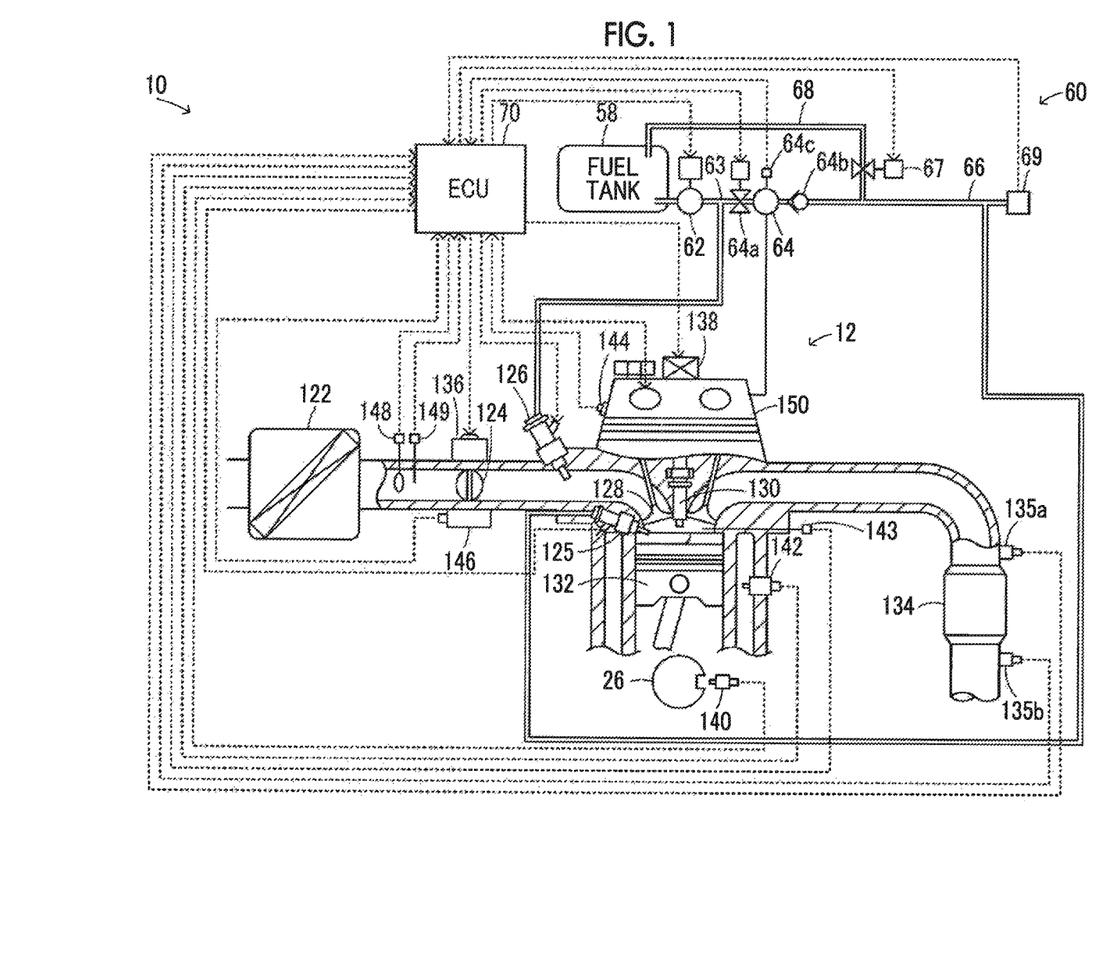
FIG. 1 is a configuration view schematically illustrating a configuration of an engine system in an example of the disclosure.

FIG. 1 is a configuration view schematically illustrating a configuration of an engine system 10 in an example of the disclosure. As illustrated in FIG. 1, the engine system 10 in the example is provided with an engine 12, a fuel supply device 60, and an electronic control unit (hereinafter, will be referred to as "ECU") 70 that performs operation control of the engine 12. The engine system 10 is installed in an automobile that travels by using power from the engine 12 alone or a hybrid automobile that travels by using power from the engine 12 and a motor (not shown).

The engine 12 is configured as an internal-combustion engine that includes a plurality of cylinders (for example, four cylinders, six cylinders, eight cylinders, or the like) and outputs power by using fuel, such as gasoline or gas oil. As illustrated in FIG. 1, the engine 12 includes an in-cylinder injection valve 125 that injects fuel into a cylinder and a port injection valve 126 that injects fuel into an intake port. Since the engine 12 includes the in-cylinder injection valve 125 and the port injection valve 126, the engine 12 is able to be operated in any of a port injection mode, an in-cylinder injection mode, and a double injection mode. In the port injection mode, air controlled by an air cleaner 122 is taken in via a throttle valve 124 and fuel is injected from the port injection valve 126 such that the air and the fuel are mixed with each other. Then, the air-fuel mixture is taken into a combustion chamber via an intake valve 128 and explosive combustion is caused by an electric spark that is generated by an ignition plug 130. A reciprocating motion of a piston 132 that is pressed down due to energy from the explosive combustion is converted into a rotary motion of a crankshaft 26. In the in-cylinder injection mode, air is taken into the combustion chamber in the same manner as in the port injection mode and fuel is injected from the in-cylinder injection valve 125 in the middle of an intake stroke or at the time of a compression stroke. Then, explosive combustion is caused by the electric spark that is generated by the ignition plug 130 to achieve the rotary motion of the crankshaft 26. In the double injection mode, fuel is injected from the port injection valve 126 when air is taken into the combustion chamber and fuel is injected from the in-cylinder injection valve 125 during the intake stroke and the compression stroke. Then, explosive combustion is caused by the electric spark that is generated by the ignition plug 130 to achieve the rotary motion of the crankshaft 26. The injection triodes are switched based on the operation state of the engine 12. Exhaust gas from the combustion chamber is discharged to the outside air via an exhaust gas control apparatus 134 that includes an exhaust gas control catalyst (three-way catalyst) that controls harmful components of carbon monoxide (CO), hydrocarbon (HC), and nitrogen oxide (NOx).

The fuel supply device 60 is configured to supply fuel from a fuel tank 58 to the in-cylinder injection valve 125 or the port injection valve 126 of the engine 12. The fuel supply device 60 is provided with an electromotive fuel pump 62 that supplies the fuel from the fuel tank 58 to a fuel pipe 63 to which the port injection valve 126 is connected and a high-pressure fuel pump 64 that applies a pressure to the fuel in the fuel pipe 63 to supply the fuel to a delivery pipe 66 to which the in-cylinder injection valve 125 is connected. In addition, the fuel supply device 60 is provided with a relief valve 67 that is provided in a relief pipe 68 connected to the delivery pipe 66 and the fuel tank 58. The relief valve 67 can reduce the pressure of fuel (fuel pressure) in the delivery pipe 66, to which a pressure is applied, by using the difference between the fuel pressure and the atmospheric pressure. The high-pressure fuel pump 64 is a pump that applies a pressure to the fuel in the fuel pipe 63 by being driven by power from the engine 12 (rotation of camshaft). The high-pressure fuel pump 64 includes an electromagnetic valve 64a that is connected to an intake port of the high-pressure fuel pump 64 and is opened or closed when a pressure is applied to fuel and a check valve 64b that is connected to a discharge port of the high-pressure fuel pump 64, prevents fuel from flowing backwardly, and holds the fuel pressure in the delivery pipe 66. Accordingly, the high-pressure fuel pump 64 takes in fuel from the fuel pump 62 when the electromagnetic valve 64a is opened while the engine 12 is being operated and intermittently feeds fuel compressed by a plunger (not shown) that is operated by power from the engine 12 to the delivery pipe 66 via the check valve 64b when the electromagnetic valve 64a is closed such that a pressure applied to fuel to be supplied to the delivery pipe 66. The relief valve 67 is an electromagnetic valve that prevents the fuel pressure in the delivery pipe 66 from becoming excessive and is opened when the engine 12 is in a stopped state such that the fuel pressure in the delivery pipe 66 is reduced. When the relief valve 67 is opened, fuel in the delivery pipe 66 returns to the fuel tank 58 via the relief pipe 68.

Although not shown, the ECU 70 is configured as a microprocessor centered around a CPU and is provided with a ROM storing a processing program, a RAM temporarily storing data, an input and output port, and a communication port in addition to the CPU.

Signals from various sensors needed for operation control of the engine 12 are input to the ECU 70 via an input port. Examples of the signals input to the ECU 70 include a crank position θcr from a crank position sensor 140 that detects the rotary position of the crankshaft 26 and a coolant temperature Tw from a coolant temperature sensor 142 that detects the temperature of coolant for the engine 12. In addition, examples of the signals input to the ECU 70 further include an in-cylinder pressure Pin from a pressure sensor 143 that is installed in the combustion chamber and a cam position θca from a cam position sensor 144 that detects the rotary position of an intake camshaft that opens or closes the intake valve 128 or an exhaust camshaft that opens or closes an exhaust valve. Furthermore, examples of the signals input to the ECU 70 further include a throttle opening degree TH from a throttle valve position sensor 146 that detects the position of the throttle valve 124, an intake air amount Qa from an air flow meter 148 attached to an intake pipe, and an intake air temperature Ta from a temperature sensor 149 attached to the intake pipe. In addition, examples of the signals input to the ECU 70 further include an air-fuel ratio AF from an air-fuel ratio sensor 135a attached to an exhaust pipe and an oxygen signal O2 from an oxygen sensor 135b attached to the exhaust pipe. In addition, examples of the signals input to the ECU 70 further include a rotation rate Np from a rotation rate sensor 64c that detects the rotation rate of the high-pressure fuel pump 64 and a fuel pressure Pf (hereinafter, referred to as "detected fuel pressure Pfdet") from a fuel pressure sensor 69 that detects the fuel pressure in the delivery pipe 66 of the fuel supply device 60 (fuel pressure of fuel supplied to in-cylinder injection valve 125).

Various control signals for operation control of the engine 12 are output from the ECU 70 via an output port. Examples of the signals output from the ECU 70 include a drive signal to the in-cylinder injection valve 125, a drive signal to the port injection valve 126, a drive signal to a throttle motor 136 that adjusts the position of the throttle valve 124, and a control signal to an ignition coil 138 that is integrated with an igniter. In addition, examples of the signals output from the ECU 70 further include a control signal to a variable valve timing mechanism 150 that can change opening and closing timing of the intake valve 128, a drive signal to the fuel pump 62, a drive signal to the electromagnetic valve 64a of the high-pressure fuel pump 64, and a drive signal to the relief valve 67.

The ECU 70 calculates a rotation rate Ne of the engine 12 based on the crank position θcr from the crank position sensor 140 or calculates the volumetric efficiency (ratio between piston displacement in engine 12 per cycle and volume of air actually taken in one cycle) KL based on the intake air amount Qa from the air flow meter 148 and the rotation rate Ne of the engine 12.

In the engine system 10 in the example that is configured as described above, the ECU 70 performs intake air amount control, fuel injection control, and ignition control of the engine 12 such that the engine 12 is operated at a target rotation rate Ne* and a target torque Te*. The ignition control is not a main part of the aspect of the disclosure and thus detailed description thereof will be omitted. In the intake air amount control, a target air amount Qa* is set based on the target torque Te*, a target throttle opening degree TH* is set such that the intake air amount Qa becomes equal to the target air amount Qa*, and the throttle motor 136 is driven and controlled such that the throttle opening degree TH becomes equal to the target throttle opening degree TH*. In the fuel injection control, first, an injection mode to be executed is set from the port injection mode, the in-cylinder injection mode, and the double injection mode based on the operation state of the engine 12 (for example, rotation rate Ne or volumetric efficiency KL of engine 12). Thereafter, target fuel injection amounts Qfd*, Qfp* of the in-cylinder injection valve 125 and the port injection valve 126 are set based on the target air amount Qa* and the injection mode to be executed such that the air-fuel ratio AF becomes equal to a target air-fuel ratio AF* (for example, stoichiometric air-fuel ratio). Then, target fuel injection times τfd*, τfp* of the in-cylinder injection valve 125 and the port injection valve 126 are set based on the target fuel injection amounts Qfd*, Qfp* and the in-cylinder injection valve 125 and the port injection valve 126 are driven and controlled such that fuel is injected from the in-cylinder injection valve 125 and the port injection valve 126 for the target fuel injection times τfd*, τfp*.

The target fuel injection time τfd* of the in-cylinder injection valve 125 is set based on the target fuel injection amount Qfd* and the detected fuel pressure Pfdet from the fuel pressure sensor 69. Specifically, the target fuel injection time τfd* is set such that the target fuel injection time τfd* pertaining to a case where the target fuel injection amount Qfd* is relatively large becomes long in comparison with a case where the target fuel injection amount Qfd* is small. More specifically, the target fuel injection time τfd* is set such that the larger the target fuel injection amount Qfd* is, the longer the target fuel injection time τfd* is. The target fuel injection time τfp* of the port injection valve 126 is set based on the target fuel injection amount Qfp*. Specifically, the target fuel injection time τfp* is set such that the target fuel injection time τfp* pertaining to a case where the target fuel injection amount Qfp* is relatively large becomes long in comparison with a case where the target fuel injection amount Qfp* is small. More specifically, the target fuel injection time τfp* is set such that the larger the target fuel injection amount Qfp* is, the longer the target fuel injection time τfp* is.

In addition, when the engine 12 is operated, the high-pressure fuel pump 64 (electromagnetic valve 64a) is driven and controlled such that the detected fuel pressure Pfdet becomes equal to a target fuel pressure Pf*. The target fuel pressure Pf* is set based on the operation state of the engine 12 (rotation rate Ne or volumetric efficiency KL of engine 12). In the example, until a certain period of time elapses after the engine 12 starts to be operated, the fuel injection control is performed with the in-cylinder injection mode being set as the execution injection mode.

When a determination condition for performing imbalance determination is satisfied, the ECU 70 executes the imbalance determination of determining whether there is an imbalance between the cylinders in fuel injection amount during the in-cylinder injection or the port injection. An imbalance determination condition includes a determination precondition for performing the imbalance determination and a determination request condition for requesting the imbalance determination. The ECU 70 determines that the determination precondition is satisfied when the coolant temperature Tw is equal to or higher than a threshold value Twref. The threshold value Twref is a threshold value that is used in determination on whether the engine 12 is warmed up. For example, the threshold value Twref is 70° C., 75° C., or 80° C. The ECU 70 determines that the determination request condition is satisfied when the operating point of the engine 12 is within a determination region for (suitable for) performing the imbalance determination with respect to the in-cylinder injection or the port injection. The determination region is determined as a region in which the rotation rate Ne of the engine 12 is equal to or higher than a predetermined rotation rate Ne1 and is equal to or lower than a predetermined rotation rate Ne2 and the volumetric efficiency KL of the engine 12 is equal to or higher than a predetermined efficiency KL1 and is equal to or lower than a predetermined efficiency KL2. Here, the predetermined rotation rate Ne1 is, for example, 1150 rpm, 1200 rpm, or 1250 rpm. The predetermined rotation rate Ne2 is, for example, 1950 rpm, 2000 rpm, or 2050 rpm. The predetermined efficiency KL1 is, for example, 38%, 40%, or 42%. The predetermined efficiency KL2 is, for example, 63%, 65%, or 67%. The imbalance determination condition is satisfied when two conditions of the determination precondition and the determination request condition are satisfied. In the imbalance determination, rich imbalance determination of determining whether the fuel injection amount with respect to any of the cylinders is larger than the fuel injection amount with respect to the other of the cylinders and lean imbalance determination of determining whether the fuel injection amount with respect to any of the cylinders is smaller than the fuel injection amount with respect to the other of the cylinders are performed. In the rich imbalance determination, the ECU 70 monitors the waveform of the air-fuel ratio AF from the air-fuel ratio sensor 135a and determines that a rich imbalance has occurred when inclination kaf of the waveform exceeds a determination threshold value kafth. The determination threshold value kafth is set as a value that is obtained by multiplying the maximum value kref of inclination of the waveform of the air-fuel ratio AF from the air-fuel ratio sensor 135a pertaining to a case where there is no abnormality in a fuel injection system by k (for example, 1.2, 1.4, or 1.6). In the lean imbalance determination, the ECU 70 determines whether a lean imbalance has occurred or not in the same manner as in the rich imbalance determination or determines whether there is an imbalance between the cylinders in fuel injection amount by using a time T30 taken for the crank angle θcr from the crank position sensor 140 to rotate 30° from the top dead point in each cylinder (rotational variation of engine 12). Note that, the imbalance determination with respect to the in-cylinder injection can be performed in a case where the engine 12 is operated in the in-cylinder injection mode and in a case where the engine 12 is operated with a ratio of the in-cylinder injection to the port injection being 8:2 or 7:3. On the contrary, the imbalance determination with respect to the port injection can be performed in a case where the engine 12 is operated in the port injection mode and in a case where the engine 12 is operated with a ratio of the port injection to the in-cylinder injection being 8:2 or 7:3.

Figure 2:
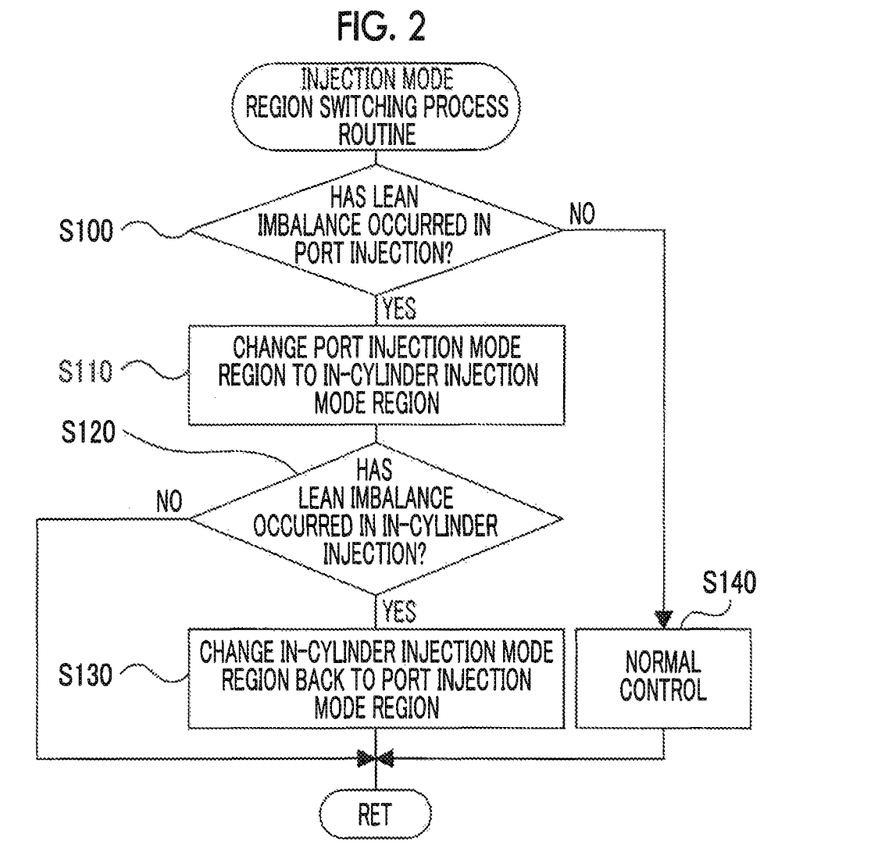
FIG. 2 is a flowchart illustrating an example of an injection mode region switching process routine that is executed by an ECU.

Next, the operation of the engine system 10 in the example that is configured as described above, particularly the operation of the engine system 10 pertaining to a case where the ECU 70 determines that the lean imbalance has occurred in the port injection will be described. FIG. 2 is a flowchart illustrating an example of an injection mode region switching process routine that is executed by the ECU 70.

When the injection mode region switching process routine is executed, the ECU 70 first checks whether the result of the imbalance determination indicates that the lean imbalance has occurred in the port injection (step S100). When the ECU 70 determines that no lean imbalance has occurred in the port injection, the ECU 70 performs normal control (step S140) and the routine is terminated. Here, the normal control in the routine is an operation of maintaining a region of an injection mode (port injection mode, in-cylinder injection mode, or double injection mode) that is predetermined for each operating point of the engine 12.

When the ECU 70 determines that the lean imbalance has occurred in the port injection in step S100, a port injection mode region in the engine operating region is changed to an in-cylinder injection mode region (step S110). The port injection mode region is a region in which operating the engine 12 in the port injection mode is advantageous in terms of fuel efficiency and stability in comparison with operating the engine 12 in the in-cylinder injection mode. However, when the lean imbalance occurs in the port injection, operating the engine 12 in the in-cylinder injection mode with no lean imbalance is further favorable in suppressing a decrease in fuel efficiency and stability. In addition, when the lean imbalance continues, there is a possibility of an increase in temperature of the exhaust gas control catalyst (three-way catalyst) of the exhaust gas control apparatus 134, which may result in the exhaust gas control catalyst being overheated. However, it is possible to restrain the exhaust gas control catalyst from being overheated by appropriately correcting the lean imbalance by switching to the in-cylinder injection mode region.

Thereafter, the ECU 70 checks whether the result of the imbalance determination after the change in mode region indicates that the lean imbalance has occurred in the in-cylinder injection (step S120). When the ECU 70 determines that no lean imbalance has occurred in the in-cylinder injection, the ECU 70 maintains the result of the change in mode region and the routine is terminated. When the ECU 70 determines that the lean imbalance has occurred in the in-cylinder injection, the ECU 70 changes a region after the region change back to the port injection mode region (step S130) and the routine is terminated. Like other many general engines, in the engine 12 in the example, when the lean imbalance occurs in the port injection in the port injection mode region and the lean imbalance occurs in the in-cylinder injection, the degree of the lean imbalance in the port injection is smaller than the degree of the lean imbalance in the in-cylinder injection. Therefore, when the ECU 70 determines that the lean imbalance has occurred in the in-cylinder injection after the port injection mode region is changed to the in-cylinder injection mode region, it is possible to reduce the degree of the imbalance by changing the region after the change back to the port injection mode region.

Figure 3:
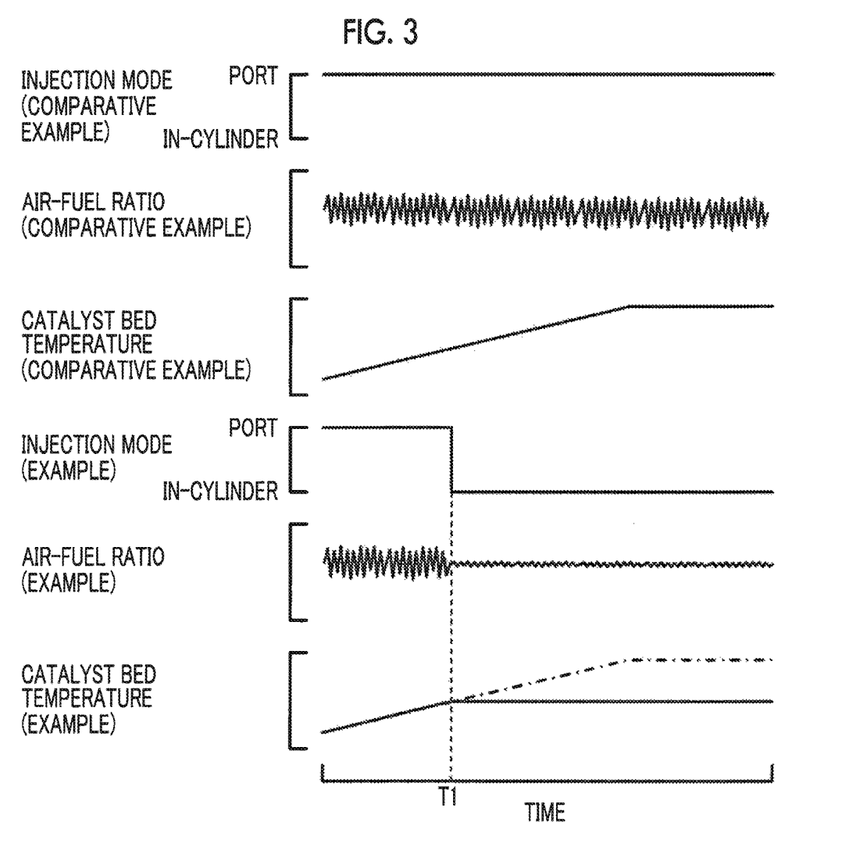
FIG. 3 is an explanatory diagram illustrating temporal change in injection mode, air-fuel ratio, and catalyst bed temperature in a comparative example and the example.

FIG. 3 is an explanatory diagram illustrating an example of temporal change in injection mode, air-fuel ratio, and catalyst bed temperature in a comparative example and the example pertaining to a case where an imbalance occurs in the port injection. In FIG. 3, a one-dot chain line in "catalyst bed temperature (example)" represents the catalyst bed temperature (comparative example). The comparative example is related to a case where the port injection mode region is maintained even when an imbalance occurs in the port injection. In the comparative example, when an imbalance occurs in the port injection, the air-fuel ratio varies relatively greatly and the catalyst bed temperature increases with time, which results in the catalyst being overheated. Meanwhile, in the example, the port injection mode region is changed to the in-cylinder injection mode region at time T1 at which the ECU 70 determines that an imbalance has occurred in the port injection and thus the injection mode is switched from the port injection mode to the in-cylinder injection mode. Since no imbalance occurs in the in-cylinder injection in this case, the relatively great variation in air-fuel ratio becomes small and the catalyst bed temperature is maintained without further increasing.

Figure 4:
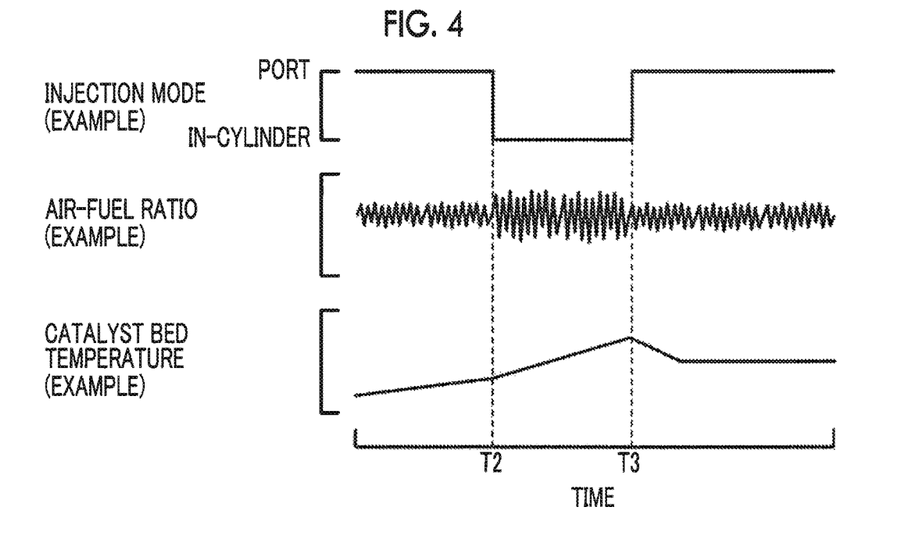
FIG. 4 is an explanatory diagram illustrating temporal change in injection mode, air-fuel ratio, and catalyst bed temperature in the example.

FIG. 4 is an explanatory diagram illustrating temporal change in injection mode, air-fuel ratio, and catalyst bed temperature in the example pertaining to a case where the ECU 70 determines that the lean imbalance in the in-cylinder injection has occurred in the imbalance determination after the region change that is made due to the lean imbalance occurring in the port injection. Since the ECU 70 determines that an imbalance has occurred in the port injection due to a relatively great variation in air-fuel ratio, the port injection mode region is changed to the in-cylinder injection mode region at time T2 and the injection mode is switched from the port injection mode to the in-cylinder injection mode. Since the lean imbalance occurs also in the in-cylinder injection in this case, the air-fuel ratio further greatly varies. When the ECU 70 determines that the lean imbalance has occurred in the in-cylinder injection, the region after the change is changed back to the port injection mode region, which is the original injection mode region, and the variation in air-fuel ratio is changed back to the original state. The rate of increase in catalyst bed temperature becomes relatively large after the region change. However, when the region after the change is changed back to the original region, the catalyst bed temperature converges to a temperature corresponding to the degree of imbalance in the port injection.

In the engine system 10 in the example as described above, when the ECU 70 determines that the lean imbalance has occurred in the port injection, the port injection mode region is changed to the in-cylinder injection mode region. Therefore, it is possible to further restrain the exhaust gas control catalyst of the exhaust gas control apparatus 134 attached to an exhaust system of the engine 12 from being overheated and to further suppress an imbalance. When the ECU 70 determines that the lean imbalance has occurred in the port injection in the imbalance determination that is performed after the port injection mode region is changed to the in-cylinder injection mode region, the region after the change is changed back to the port injection mode region, which is the original injection mode region. Accordingly, it is possible to reduce the degree of the imbalance in comparison with a case where the region after the change is maintained.

Figure 5:
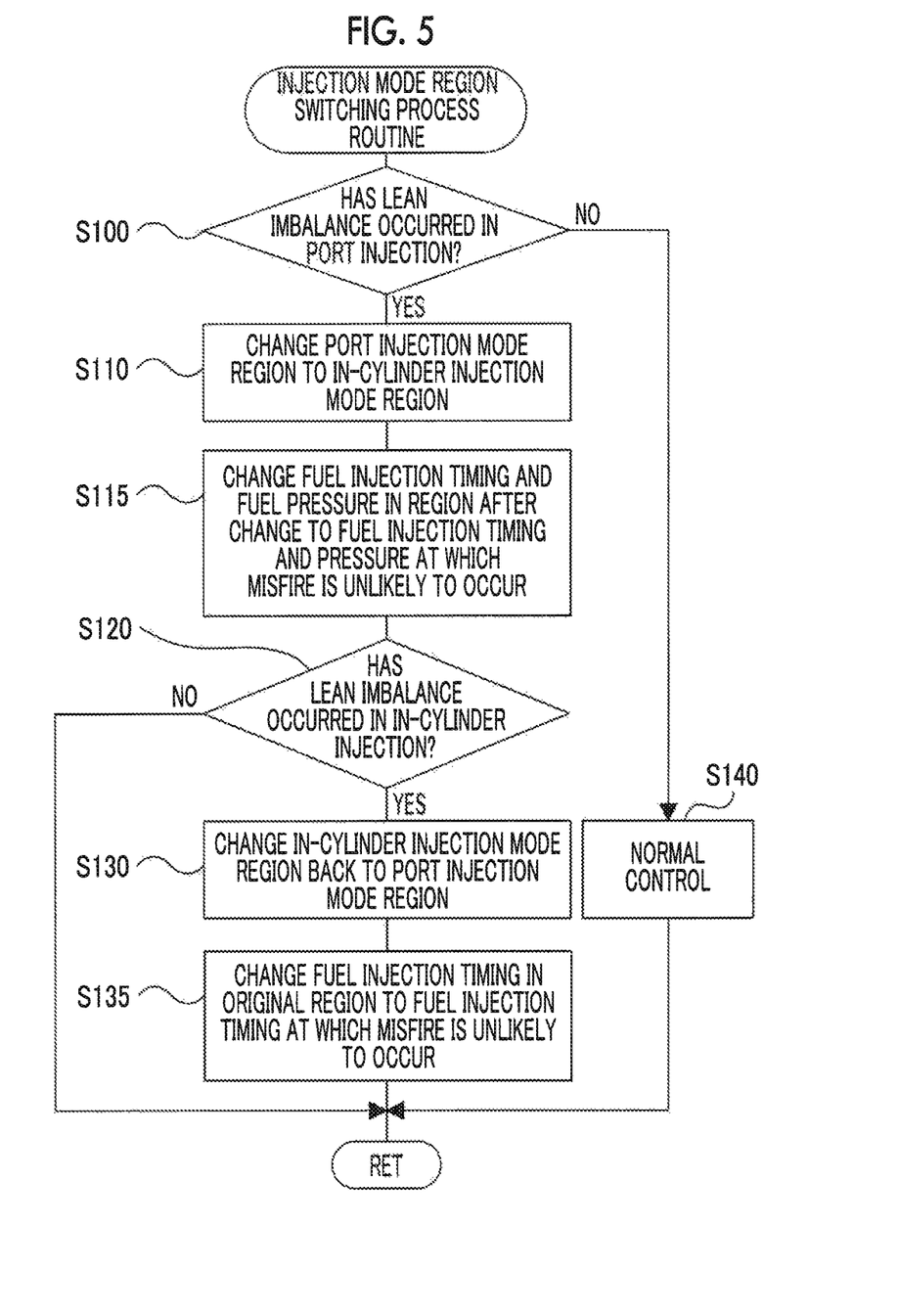
FIG. 5 is a flowchart illustrating an example of an injection mode region switching process routine in the comparative example.

In the engine system 10 in the example, when the ECU 70 determines that the lean imbalance has occurred in the port injection, the port injection mode region is changed to the in-cylinder injection mode region. In addition to the region change as described above, as in the injection mode region switching process routine in the modification example illustrated in FIG. 5, the fuel injection timing in the in-cylinder injection and a fuel pressure Pfd in the delivery pipe 66 may be changed to a fuel injection timing and a pressure at which misfire is unlikely to occur (step S115) when there is a region change. The port injection mode region is a region in which operating the engine 12 in the port injection mode is advantageous in terms of fuel efficiency and stability in comparison with operating the engine 12 in the in-cylinder injection mode. Therefore, since the fuel injection timing and the fuel pressure Pfd are set such that misfired is unlikely to occur when the engine is operated after the port injection mode region is changed to the in-cylinder injection mode region, a decrease in fuel efficiency and stability caused by switching to the in-cylinder injection mode region can be further suppressed. Here, as the "fuel injection timing at which misfire is unlikely to occur", a fuel injection timing with the lowest possibility of misfire obtained by an experiment or the like, a fuel injection timing close to such a fuel injection timing, or a fuel injection timing at which stable explosive combustion can be achieved may be used.

In the engine system 10 in the example, when the ECU 70 determines that the lean imbalance has occurred in the in-cylinder injection in the imbalance determination that is performed after the region change, the region after the change is changed back to the port injection mode region, which is the original injection mode region. In addition to changing the region after the change back to the original region as described above, as in the injection mode region switching process routine in the modification example illustrated in FIG. 5, the fuel injection timing in the port injection may be changed to a fuel injection timing at which misfire is unlikely to occur (step S135) when the region after the change is changed back to the original region. In this case, it is possible to further suppress the degree of the imbalance.

The in-cylinder injection valve 125 in an example is an example of the "in-cylinder injection valve", the port injection valve 126 is an example of the "port injection valve", and the engine 12 is an example of the "engine". The fuel tank 58 is an example of the "fuel tank", the fuel pipe 63 is an example of the "first supply flow path", the fuel pump 62 is an example of the "first pump", the delivery pipe 66 is an example of the "second supply flow path", the high-pressure fuel pump 64 is an example of the "second pump", and the fuel supply device 60 is an example of the "fuel supply device". In addition, the electronic control unit 70 (ECU 70) is an example of the "electronic control unit". Further, the injection mode is an example of "a region" of the fuel injection. The port injection mode region is an example of "a first fuel injection region". The in-cylinder injection mode region is an example of "a second fuel injection region".

The example and the main elements according to the aspect of the disclosure described in SUMMARY is not to limit the components according to the aspect of the disclosure described in SUMMARY. That is, the aspect of the disclosure described in SUMMARY may be interpreted based on description in SUMMARY and the example is merely a specific example of the aspect of the disclosure described in SUMMARY.

Hereinabove, the embodiment has been described by using the example. However, the aspect of the disclosure is not limited to the example and may be implemented in various forms of course without departing from the scope of the disclosure.

The disclosure can be used in engine system manufacturing industry.

What is claimed is:
1. An engine system comprising:
an engine having a plurality of cylinders, the engine including an in-cylinder injection valve and a port injection valve, the in-cylinder injection valve being configured to inject fuel into each cylinder of the engine, and the port injection valve being configured to inject fuel into an intake port of the engine;
a fuel supply device including a first pump and a second pump, the first pump being configured to apply a pressure to fuel from a fuel tank such that the fuel is supplied to a first supply flow path to which the port injection valve is connected, and the second pump being configured to apply a pressure to the fuel in the first supply flow path such that the fuel is supplied to a second supply flow path to which the in-cylinder injection valve is connected; and
an electronic control unit configured to control the fuel supply device and to perform operation control of the engine by adjusting an injection ratio between fuel injection from the in-cylinder injection valve and fuel injection from the port injection valve according to an operation state of the engine,
the electronic control unit being configured to perform imbalance determination based on any of a variation in air-fuel ratio and a rotational variation of the engine with respect to the fuel injection from the in-cylinder injection valve and the fuel injection from the port injection valve, the imbalance determination including determination on whether a rich imbalance is occurred and determination on whether a lean imbalance is occurred, the rich imbalance being an imbalance in which a fuel injection amount with respect to any of the cylinders is larger than a fuel injection amount with respect to the other of the cylinders, the lean imbalance being an imbalance in which a fuel injection amount with respect to any of the cylinders is smaller than a fuel injection amount with respect to the other of the cylinders; and the electronic control unit being configured to change a region of fuel injection from a first fuel injection region to a second fuel injection region when the electronic control unit determines that the lean imbalance is occurred with respect to the fuel injection from the port injection valve, the first fuel injection region being a region in which the fuel injection from the port injection valve is performed, and the second fuel injection region being a region in which the fuel injection from the in-cylinder injection valve is performed.

2. The engine system according to claim 1, wherein the electronic control unit is configured to perform the fuel injection from the in-cylinder injection valve at a fuel injection timing at which the engine is unlikely to misfire when the electronic control unit changes the region of fuel injection from the first fuel injection region to the second fuel injection region and operates the engine.

3. The engine system according to claim 1, wherein the electronic control unit is configured to control the fuel supply device such that a fuel pressure in the second supply flow path becomes a pressure at which the engine is unlikely to misfire when the electronic control unit changes the region of fuel injection from the first fuel injection region to the second fuel injection region and operates the engine.

4. The engine system according to claim 1, wherein the electronic control unit is configured to change the region of fuel injection back to the first fuel injection region from the second fuel injection region when the electronic control unit determines that the lean imbalance is occurred with respect to the fuel injection from the in-cylinder injection valve after changing the region of fuel injection from the first fuel injection region to the second fuel injection region.

5. The engine system according to claim 4, wherein the electronic control unit is configured to perform the fuel injection from the port injection valve at a fuel injection timing at which the engine is unlikely to misfire when the electronic control unit changes the region of fuel injection back to the first fuel injection region from the second fuel injection region and operates the engine.

6. A control method for an engine system,
the engine system including an engine that has a plurality of cylinders, a fuel supply device, and an electronic control unit,
the engine including an in-cylinder injection valve and a port injection valve, the in-cylinder injection valve being configured to inject fuel into each cylinder of the engine, the port injection valve being configured to inject fuel into an intake port of the engine,
the fuel supply device including a first pump and a second pump, the first pump being configured to apply a pressure to fuel from a fuel tank such that the fuel is supplied to a first supply flow path to which the port injection valve is connected, and the second pump being configured to apply a pressure to the fuel in the first supply flow path such that the fuel is supplied to a second supply flow path to which the in-cylinder injection valve is connected, the control method comprising:
controlling, by the electronic control unit, the fuel supply device and performing, by the electronic control unit, operation control of the engine by adjusting an injection ratio between fuel injection from the in-cylinder injection valve and fuel injection from the port injection valve according to an operation state of the engine;
performing, by the electronic control unit, imbalance determination based on any of a variation in air-fuel ratio and a rotational variation of the engine with respect to the fuel injection from the in-cylinder injection valve and the fuel injection from the port injection valve, the imbalance determination including determination on whether a rich imbalance is occurred and determination on whether a lean imbalance is occurred, the rich imbalance being an imbalance in which a fuel injection amount with respect to any of the cylinders is larger than a fuel injection amount with respect to the other of the cylinders, the lean imbalance being an imbalance in which a fuel injection amount with respect to any of the cylinders is smaller than a fuel injection amount with respect to the other of the cylinders; and
changing, by the electronic control unit, a region of fuel injection from a first fuel injection region to a second fuel injection region when the electronic control unit determines that the lean imbalance is occurred with respect to the fuel injection from the port injection valve, the first fuel injection region being a region in which the fuel injection from the port injection valve is performed, the second fuel injection region being a region in which the fuel injection from the in-cylinder injection valve is performed.

* * * * *